United States Patent [19]

Brown

[11] 4,228,387
[45] Oct. 14, 1980

[54] VARIABLE RELUCTANCE STEPPER MOTOR DRIVE AND METHOD OF OPERATION AS A DC BRUSHLESS MOTOR

[75] Inventor: W. Sumner Brown, Cambridge, Mass.

[73] Assignee: Exxon Research & Engineering Co., Florham Park, N.J.

[21] Appl. No.: 833,265

[22] Filed: Sep. 14, 1977

[51] Int. Cl.² ............................................ H02K 37/00
[52] U.S. Cl. ...................................... 318/696; 360/99
[58] Field of Search ............... 318/685, 696, 138, 254, 318/640, 480; 360/86, 97–99

[56] References Cited

U.S. PATENT DOCUMENTS

| 3,644,815 | 2/1972 | Falk | 318/685 |
| 3,863,118 | 1/1975 | Lander et al. | 318/254 |
| 3,867,723 | 2/1975 | Penfold et al. | 360/99 X |

*Primary Examiner*—Gene Z. Rubinson
*Attorney, Agent, or Firm*—N. L. Norris

[57] ABSTRACT

A variable reluctance motor of the stepper type is operated as a brushless constant speed DC motor by sensing the position of the rotor during rotation and generating a tachometric signal representing the speed of the rotor in response to the sensed position of the rotor. The tachometric signal is compared with a reference signal to generate a supply voltage to the windings of the stepper motor which will maintain the speed of the rotor substantially constant. The windings of the stepper motor are sequentially energized by the supply voltage in response to sensed position of the rotor. During start-up and prior to the time the motor reaches the predetermined speed, a start-up signal is utilized in addition to the sensed rotary position to sequentially energize the windings with the supplied voltage. The motor is utilized to drive a floppy magnetic data storage disc.

20 Claims, 5 Drawing Figures

VARIABLE RELUCTANCE STEPPER MOTOR DRIVE AND METHOD OF OPERATION AS A DC BRUSHLESS MOTOR

BACKGROUND OF THE INVENTION

This invention relates to magnetic data storage discs including so-called "floppy discs".

In prior art floppy disc drives the disc is driven by a DC motor so as to create arcuate movement of the floppy disc relative to a read/write head. The arcuate movement of the floppy disc moves the disc relative to the head through so-called sectors of the disc.

In general, the floppy disc drive must have a number of important characterisitcs. First, the drive must assure a constant or fixed speed of the disc relative to the read/write head. Second, it is important that the motor be relatively noise free, i.e., the motor itself does not produce electromagnetic noise which might interfere with the data storage or the reading and writing of stored data. Third, it is desirable that the drive be characterized by low cost and long life. Finally, it is desirable that the drive be compact. In this connection, it should be appreciated that floppy discs may be utilized in a variety of applications where space is at a premium. One such application is in an electronic memory typewriter.

SUMMARY OF THE INVENTION

It is an object of this invention to provide a motor drive system which is characterized by sufficiently constant speed so as to allow its use in a data storage disc drive.

It is a further object of this invention to provide a motor drive system and method of operation which is sufficiently compact so as to permit its use in a data storage disc drive where space considerations are at a premium.

It is a further object of this invention to provide a motor drive system and method of operation which is characterized by sufficiently long life and low cost so as to permit its use in a data storage disc drive.

It is a further specific object of this invention to provide a motor drive system and method of operation which is characterized by sufficiently low noise so as to permit its use in a data storage disc drive.

In accordance with these and other objects, the motor drive system comprises a rotary stepper motor including a rotor, a stator having a plurality of pole positions and windings associated with the stator at the pole positions. Sensing means sense the position of the rotor and tachometer means coupled to the sensing means generate a signal representing the rotational speed of the rotor. Speed control means which are coupled to the tachometer means generate a supply voltage in response to the speed of the motor. Sequence control means coupled to the speed control means include means for sequentially applying the supply voltage to the winding means for sequentially applying the supply voltage to the winding means for sequential energization thereof.

The speed control means includes means for comparing the tachometer signal with a reference signal so as to produce a supply voltage in response to the comparison which will tend to reduce the difference between the tachometer signal and the reference signal.

The drive system further comprises start-up means coupled to the sensing means of the motor drive means for applying an input signal to the motor drive means to change the phase relationship between the mechanical motor position and the motor winding energization sequence until a predetermined speed is reached. Preferably, the start-up means comprises an oscillator which produces pulses for this purpose.

In a preferred embodiment of the invention, a drive system is incorporated in a magnetic data storage disc drive comprising a read/write head for reading or writing data on the disc. Such a data storage disc drive includes a read/write control for determining the position of the disc relative to the read/write head by sensing the position of the disc. An on/off control is coupled to the tachometer means for controlling the motor by turning the motor off in response to an appropriate command. The drive further comprises a head drive coupled to the read/write head for indexing the head radially across the disc.

DETAILED DESCRIPTION OF A PREFERRED EMBODIMENT

Figure 1:
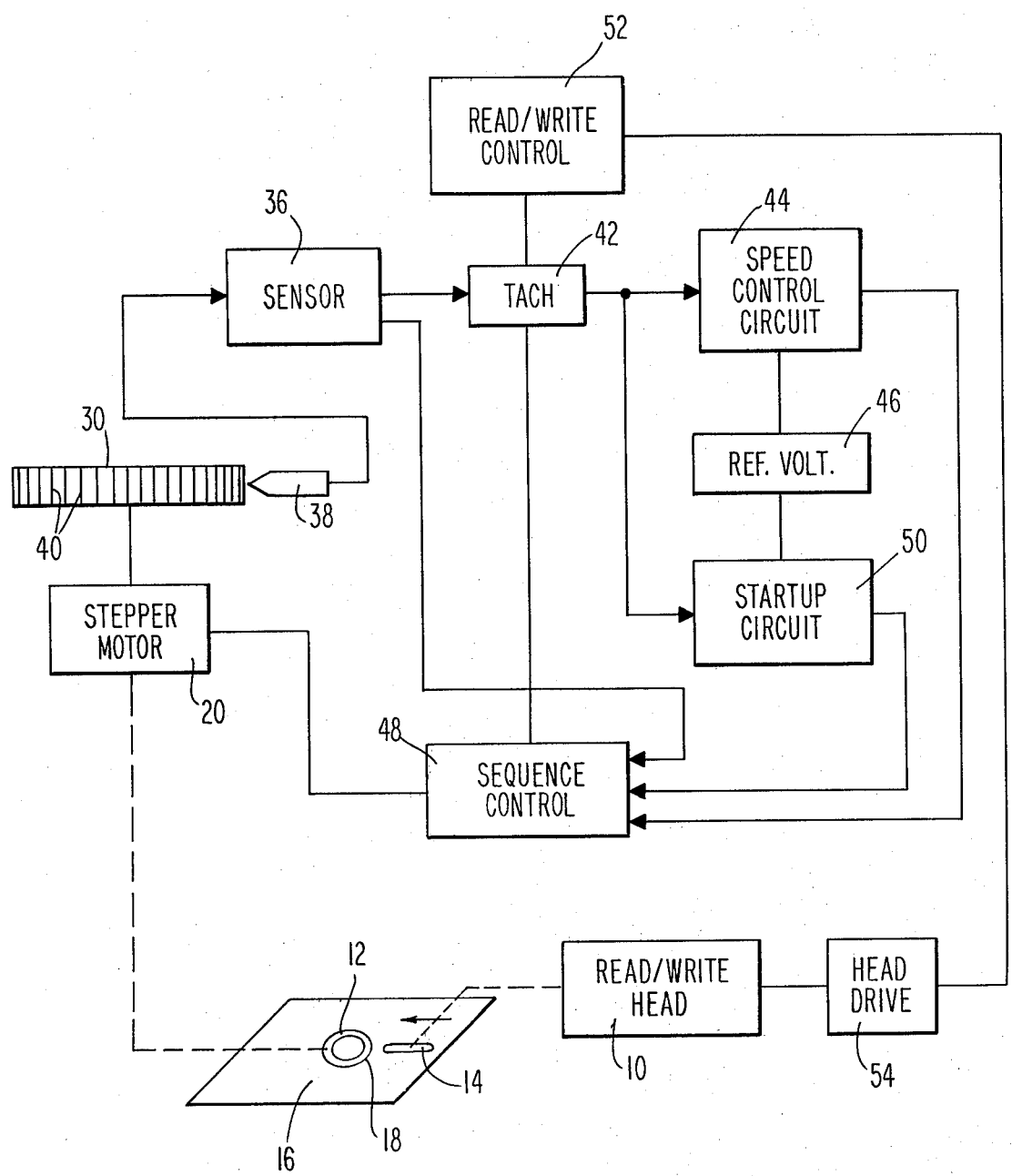
FIG. 1 is a block diagram which represents a preferred embodiment of the invention.

A floppy disc data storage and retrieval system as shown and described in FIG. 1 comprises a read/write head 10 magnetically coupled to a floppy disc 12 through an elongated access opening 14 in a jacket 16. The disc 12 is suitably clamped at a hub 18 and driven by a variable reluctance motor 20 of the stepper type.

Figure 2:
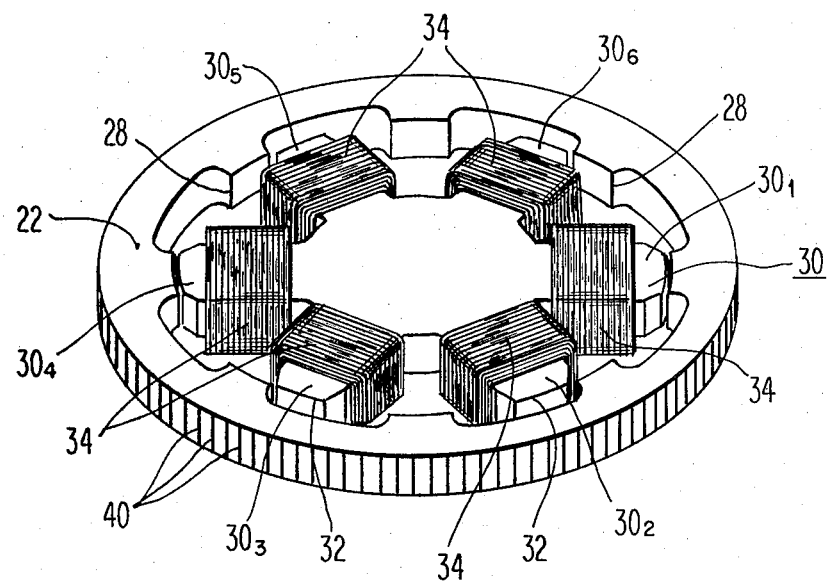
FIG. 2 is a perspective view of the stepper motor shown in FIG. 1.

As shown in FIG. 2, the motor 20 comprises a stator 30 and a rotor 22 is rotatably mounted around an air gap 28.

In accordance with standard stepper motor practice, the stator 30 comprises a plurality of pole positions $30_{1-6}$. Each of the pole positions $30_{1-6}$ has a single tooth 32 and a winding 34 associated therewith. In this particular embodiment, the windings are energized in three different phases to achieve varying degrees of alignment between the various teeth at the various pole positions and the teeth of the rotor 22.

Referring again to FIG. 1, the rotor 22 is shown in conjunction with sensor means 36 including a photodetector 38 which is optically coupled to the rotor 22 so as to sense a plurality of hash marks 40 on the rotor 22.

In accordance with one important aspect of this invention, the sensor means 36 is coupled to a tachometer 42 which generates a tachometric signal representing the speed of the rotor 22. The tachometer signal is applied to a speed control circuit 44 which generates a speed control signal representing the difference between the tachometric signal and a reference signal generated by a reference voltage supply 46 so as to adjust the voltage provided to the windings of the stepper motor as applied by a sequence control circuit 48. The adjustment in the voltage applied to the windings in response to the output of the speed control circuit 44 assures, through a closed loop operation, that the speed of the motor 20 is maintained substantially constant. The sensor 36 is also coupled to the sequence control circuit 48 so as to provide position signals which sequentially apply the voltage through the windings of the stepper motor 20.

In accordance with another aspect of the invention, the tachometer signal from the tachometer 42 is applied to a start-up circuit 50. The start-up circuit 50 compares the tachometer signal with a reference signal which is provided by the reference voltage supply 46 to determine when the speed of the rotor has reached a predetermined level. The start-up circuit 50 can provide pulses to the drive circuit 48 for purposes of changing the phase relationship between motor mechanical position and motor electrical excitation until the motor reaches a predetermined speed. After said predetermined speed has been reached, the sequential energization is controlled at the motor drive circuit 48 by the output from the sensor means 36 only.

Starting and stopping of the motor 20 is effected by supplying an appropriate signal to the tachometer 42 from the read/write control 52.

In addition to this function, the read/write control 52 also supplies an input to a head drive 54 which indexes the head 10 to the appropriate position on the disc 12. In this connection, it will be understood that the head 10 moves radially across the disc 12 accessing the disc through the opening 14.

The sensor circuit 36 will now be described with reference to FIG. 3A wherein a light emitting diode 100 is associated with a phototransistor 104. As the hash marks 40 on the rotor 22 pass before the light emitting diode 100 and the phototransistor 104, a current flows through transistor 104 in response to the dark/light variations created by the hash marks 40. More particularly, current will flow from the +5 volt power supply and the transistor 104 to the emitter in the absence of the hash marks 40. The same current flow will be interrupted in the presence of the hash marks 40. Current for the light emitting diode 100 and 102 is provided by a +15 volt power supply and an associated filter network comprising resistors 112 and 114 and a capacitor 116.

The output from transistor 104 which varies in response to the rotation of the rotor 30 is applied to the non-inverting input of differential amplifier 118 which operate as a comparator. Feedback capacitor 122 which is associated with the differential amplifier 118 provides the amplifier with noise immunity. The output of the amplifier is connected to a +15 volt power supply through resistor 126.

The output from the amplifier 118 is applied to the tachometer circuit 42 via a buffering gate (not shown) in the sequence control circuit 48. The signal from the differential amplifier 118 is substantially a square wave with a frequency of 24 cycles in one revolution of the rotor 30 corresponding to the 24 hash marks 40 on the rotor 22

Referring again to FIG. 3A, the tachometer circuit 42 is shown comprising an adjustable monostable multivibrator 130 in series with a low pass filter 132. The average voltage of the monostable multivibrator which is triggered in response to the square wave output from the amplifier 118 is proportional to the speed of the rotor 22. The output of the monostable multivibrator is applied to a filter 132 so as to produce a voltage representing the speed of the rotor 22.

The filtered tachometric output from the tachometer circuit 42 is next applied to the speed control circuit 44 which will now be described in detail with reference to FIG. 3B. The speed control circuit 44 comprises a differential amplifier 134 having an inverting input connected to the tachometric output through a filtering network comprising a resistor 136 and a capacitor 138. A gain determining resistor 140 is connected in parallel with the capacitor 138 in the feedback path of the differential amplifier 134. The non-inverting input of the amplifier 134 is connected to a +5 volt reference voltage supply through resistors 142 and 144, 190 and 192. The voltage at the junction of the resistors 142 and 144 is supplied to the start-up circuit 50 for reasons which will be described later.

The output from the differential amplifier 134 which varies in response to the deviation of the motor from a predetermined reference speed corresponding to the reference voltage is applied to a darlington network 146 for controlling voltage applied to the windings 34 (34$_1$, 34$_2$ and 34$_3$). A transistor 148 and resistors 152 and 154 limit motor current during start-up. The capacitor 156 is provided to prevent high frequency oscillation in the output from the speed control circuit 44.

It will therefore be understood that the speed control circuit 44 provides an output voltage to the windings 34 which is controlled in response to the speed of the rotor. Accordingly, the motor 20 is operated as a brushless DC motor in accordance with this invention. However, the windings 34 of the motor 20 are sequentially energized in accordance with standard stepper motor techniques which will now be described with reference to the sequence control circuit 48 as shown in FIG. 3.

As indicated previously, the speed control circuit 48 includes a buffering capability provided by a low impedance output amplifier 158, in the form of an exclusive NOR gate 158. The buffered square wave from the tachometer circuit 42 is then applied to the clock input of a first flip-flop 160 as well as the clock input of a second flip-flop 162. The output from the gate 158 is depicted by waveform a of FIG. 4.

Figure 4:
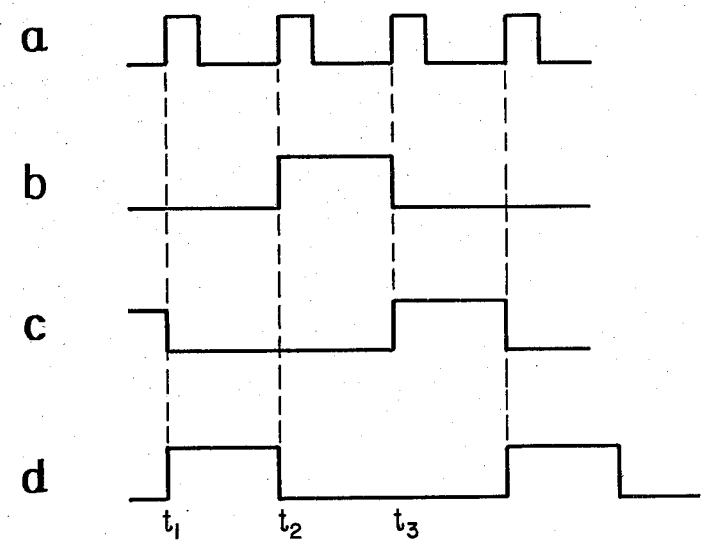
FIG. 4 is a waveform diagram utilized to explain the operation of the circuitry shown in FIG. 2.

Since at time t$_1$ the data input of the flip-flop 160 as depicted by waveform d of FIG. 4 is low whereas the data input of the flip-flop 162 is high as depicted by waveform c, the Q output of the flip-flop 162 will go high at the next positive transition of wave-form a as depicted by waveform d of FIG. 4. At time t$_2$ corresponding to the leading edge of the next pulse from the gate 158, the data input of the flip-flop 160 is high as represented by waveform d such that the Q output of the flip-flop 160 goes high as represented by waveform b. Finally, at time t$_3$ corresponding to the next pulse from the gate 158, both inputs to the exclusive NOR gate 164 go low so as to produce a high going output as depicted by waveform c of FIG. 4.

It will therefore be clear by reference to waveforms a-d of FIG. 4, that sequential phase control signals are generated and available for use to sequentially energize the windings 34. These phase control signals are applied through resistors 166, 168 and 170 to base terminals of power transistors 172, 174 and 176 respectively. The collectors of the transistors 172, 174 and 176 are connected to the windings 34$_1$, 34$_2$ and 34$_3$ and a +15 volt power supply through clamping diodes 178, 180 and 182. The capacitors 184, 186 and 188 in the base to collector circuit of the transistors 172, 174 and 176 are used for noise reduction.

The output from the start-up circuit 50 as shown in FIG. 4 is also connected to one input of the gate 158. This input, in the form of pulses at the rate of approximately one per second, is capable of changing the phase relationship between rotor position and electrical excitation (i.e., advances or alters the excitation sequence) prior to the time that the motor 20 reaches a predetermined reference speed hereinafter referred to as $v_{speed}$, where $v_{speed}$ is proportional to a reference voltage generated by the reference voltage circuitry 46 and divided by a voltage divider network comprising resistors 190 and 192, as shown in FIG. 3B. The voltage at the junction of the resistors 190 and 192 is compared with the filtered tachometric output from the tachometer circuit 42 at an operational amplifier 194. An oscillator circuit 196 is coupled to the output of the operational amplifier 194. When the output of amplifier 194 is high, the oscillator circuit 196 is free to oscillate so as to produce a series of output pulses applied to one input of the exclusive NOR gate 158. When the filtered tachometric signal becomes sufficiently positive as applied to the noninverting input of the amplifier 194, the output of the amplifier 194 will go low so as to terminate oscillations of the oscillator circuit.

The oscillator circuit 196 of the start-up circuit 50 comprises a timing capacitor 198 connected to the inverting terminal of an operational amplifier 200 which operates as a comparator in the oscillator circuit 196. A feedback resistor 202 is connected between the output and the noninverting terminal which is connected to ground through a resistor 204 and to a +5 volt power supply through a resistor 206. The capacitor 198 is charged through a charging resistor 208 and discharged through a diode 210 in series with a resistor 212. A pull-up resistor 214 is connected between the output of the amplifier 200 and a +5 volt power supply.

Figure 3A:
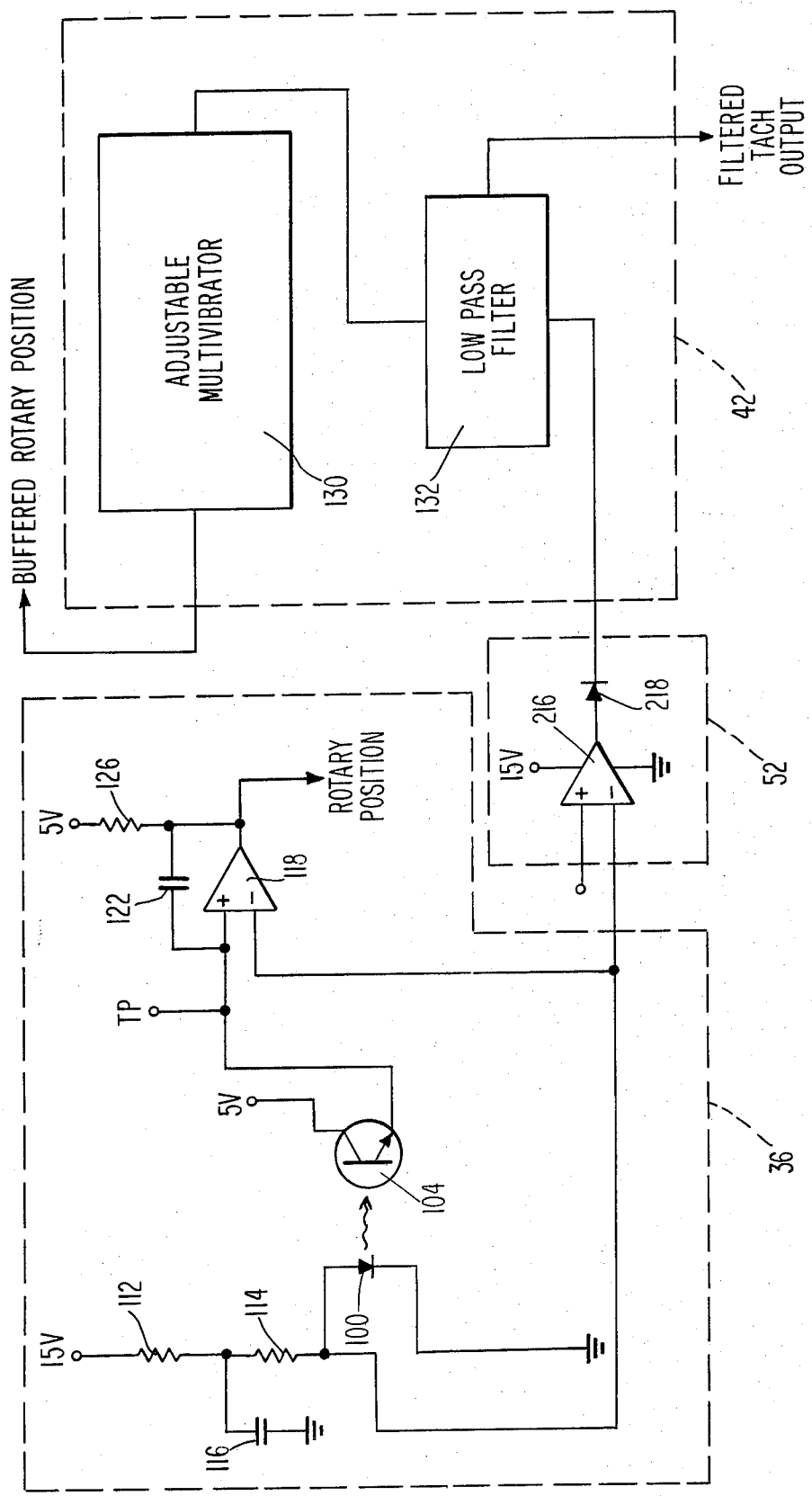
FIG. 3A is a detailed schematic diagram illustrating certain components in various blocks shown in FIG. 1.
Figure 3B:
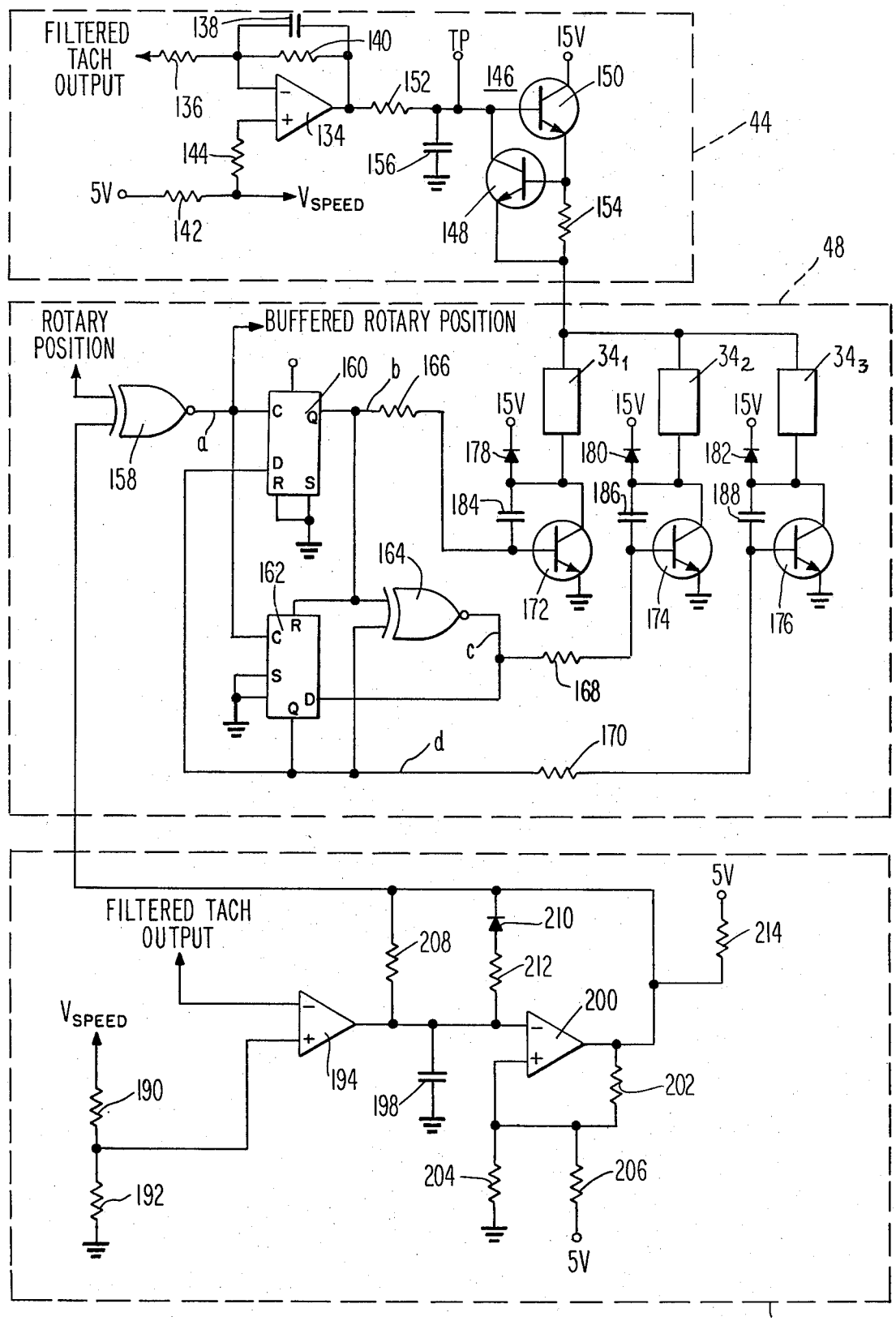
FIG. 3B is a detailed schematic diagram illustrating certain other components shown in various blocks in FIG. 1.

A portion of the read/write control circuit 52 is also shown in FIG. 3A. More particularly, an operational amplifier 216 is shown for providing an on-off control for the motor 20. The amplifier 216 includes an inverting terminal connected between the series connected light emitting diodes 100 and 102 which provides a reference voltage. The noninverting input is connected to a control input which will produce a high output turning the tachometer off when the noninverting input goes high. The output from the amplifier 216 is connected to the low pass filter 132 through a diode 218.

As utilized herein, the phrase stepper motor is intended to define a motor having a magnetic structure which is capable of permitting the motor to be stepped in discrete steps. However, it will be understood that the motor described herein is not operated as a stepper motor but rather as a brushless DC motor.

Although a specific stepper motor has been disclosed, it will be understood that various numbers of phases, pole positions, windings, and teeth may be incorporated in accordance with the state of the art in stepper motors. In this connection, reference is hereby made to "Theory and Application of Step Motors", edited by Benjamin Kuo, West Publishing Co., 1974.

Although a particular embodiment has been shown and described, it will be understood that other embodiments and modifications will occur to those of ordinary skill in the art and such embodiments and modifications fall within the true spirit and scope of the invention as set forth in the appended claims.

What is claimed is:

1. A drive for a magnetic storage disc comprising:
    a rotary variable reluctance motor of the stepper type comprising a rotor, a stator having a plurality of pole positions and windings associated with said stator at said pole positions;
    a read/write head for reading or writing data on the disc;
    means for coupling the rotor to a magnetic storage disc;
    means for sensing the position of the rotor;
    tachometer means coupled to said sensing means for generating a signal representing the rotational speed of said rotor;
    speed control means including a supply voltage means coupled to said tachometer means for producing a supply voltage having a magnitude varying in response to the speed of the motor; and
    a sequence control means coupled to said speed control means including means for sequentially supplying said supply voltage to said winding means for sequential energization thereof.

2. The drive of claim 1 wherein said speed control means includes means for comparing said tachometer signal with a reference and producing said supply voltage in response to the comparison which will tend to reduce the difference between the tachometer signal and the reference signal.

3. The drive of claim 1 further comprising start-up means coupled to said sensing means and said motor drive means for applying an input signal to said motor drive means to change the phase relationship between the mechanical motor position and the electrical energization of the motor until a predetermined speed is reached.

4. The drive of claim 3 wherein said start-up means comprises an oscillator.

5. The drive of claim 3 wherein said start-up means is coupled to said tachometer means, said tachometer means including means for interrupting the application of said input signal when a predetermined rotor speed is exceeded and reinitiating the application of said input signal when the rotor speed drops below said predetermined speed.

6. The drive of claim 1 wherein said sensing means directly communicates with said rotor substantially at the radial extremity thereof.

7. The drive of claim 6 wherein said rotor comprises a plurality of indicia and said sensing means communicates therewith.

8. The drive of claim 1 wherein said rotor comprises a plurality of teeth, said indicia being located radially outwardly of said teeth.

9. The drive of claim 1 wherein said sensing means communicates with the periphery of said rotor.

10. The drive of claim 1 wherein said stator comprises a single tooth associated with each of said winding means.

11. A drive for a magnetic storage disc comprising:
    a rotary variable reluctance motor of the stepper type comprising a rotor, a stator having a plurality of pole positions and windings carried by said stator at said pole positions;
    a read/write head for reading or writing data on the disc;
    means for coupling the rotor to a magnetic storage disc;
    means located substantially at the radial outer extremity of said rotor for directly sensing the position of the rotor;

tachometer means coupled to said sensing means for generating a signal representing the rotational speed of said rotor;

a supply voltage;

a sequence control means coupled to said speed control means including means for sequentially supplying said voltage to said winding means for sequential energization thereof; and speed control means coupled to said tachometer means for controlling said sequential energization in response to the speed of the motor so as to maintain the speed of the motor substantially constant.

12. The drive of claim 11 wherein said rotor comprises a plurality of indicia located at the periphery thereof and said sensing means communicates therewith.

13. The drive of claim 11 wherein said rotor comprises a plurality of teeth, said indicia being located radially outwardly of said teeth.

14. The drive of claim 11 wherein said sensing means communicates with the periphery of said rotor.

15. The drive of claim 11 wherein said stator comprises a single tooth associated with each of said winding means.

16. A drive for a magnetic storage disc comprising:
a rotary variable reluctance motor of the stepper type comprising a rotor, a stator having a plurality of pole positions and windings associated with said stator at said pole positions;

a read/write head for reading or writing data on the disc;

means for coupling the rotor to a magnetic storage disc;

means for sensing the position of the rotor;

tachometer means coupled to said sensing means for generating a signal representing the rotational speed of said rotor;

a supply voltage;

a sequence control means coupled to said speed control means including means for sequentially supplying said voltage to said winding means for sequential energization thereof;

speed control means coupled to said tachometer means for controlling said sequential energization in response to the speed of the motor so as to maintain the speed of the motor substantially constant; and start-up means coupled to said tachometer means and said motor drive means for continuously applying an input signal to said motor drive means to change the phase relationship between the mechanical motor position and the electrical energization of the motor until a predetermined speed is reached.

17. The drive of claim 16 wherein said start-up means also applies said input signal to said motor drive means when the motor speed falls below said predetermined speed.

18. A drive for a magnetic storage disc comprising:
a rotary variable reluctance motor of the stepper type comprising a rotor, a stator having a plurality of pole positions and windings associated with said stator at said pole positions;

a read/write head for reading or writing data on the disc;

means for coupling the rotor to a magnetic storage disc;

means for sensing the position of the rotor; p1 tachometer means coupled to said sensing means for generating a signal representing the rotational speed of said rotor;

speed control means including a supply voltage means coupled to said tachometer means for producing a supply voltage varying in response to the speed of the motor;

a sequence control means coupled to said speed control means including means for sequentially supplying said supply voltage to said winding means for sequential energization thereof; and start-up means coupled to said tachometer means and said sequence control circuit for applying an input signal to said sequence control circuit to change the phase relationship between the mechanism motor position and the electrical energization of the motor until a predetermined speed is reached, said start up means comprising an oscillator.

19. A drive for a magnetic storage disc comprising:
a rotary variable reluctance motor of the stepper type comprising a rotor, a stator having a plurality of pole positions and windings associated with said stator at said pole positions;

a read/write head for reading or writing data on the disc;

means for coupling the rotor to a magnetic storage disc;

means for sensing the position of the rotor;

tachometer means coupled to said sensing means for generating a signal representing the rotational speed of said rotor;

speed control means including a supply voltage means coupled to said tachometer means for producing a supply voltage varying in response to the speed of the motor;

a sequence control means coupled to said speed control means including means for sequentially supplying said supply voltage to said winding means for sequential energization thereof;

start-up means coupled to said tachometer means and said sequence control circuit for applying an input signal to said sequence control circuit to change the phase relationship between the mechanical motor position and the electrical energization of the motor until a predetermined speed is reached; and said tachometer means including means for interrupting the application of said input signal when a predetermined rotor speed is exceeded and reinitiating the application of said input signal when the rotor speed drops below said predetermined speed.

20. A drive for a magnetic storage disc comprising:
a rotary variable reluctance motor of the stepper type comprising a rotor, a stator having a plurality of pole positions and windings associated with said stator at said pole positions;

a read/write head for reading or writing data on the disc;

means for coupling the rotor to a magnetic storage disc;

means for sensing the position of the rotor;

tachometer means coupled to said sensing means for generating a signal representing the rotational speed of said rotor;

a supply voltage;

a sequence control means coupled to said speed control means including means for sequentially supplying said voltage to said winding means for sequential energization thereof;

speed control means coupled to said tachometer means for controlling said sequential enerigization in respons to the speed of the motor so as to maintain the speed of the motor substantially constant; and start-up means coupled to said tachometer means and said motor drive means for applying an input signal to said motor drive means to change the phase relationship between the mechanical motor position and the electrical energization of the motor until a predetermined speed is reached, said start-up means also applying said input signal to said motor drive means when the motor speed falls below said predetermined speed.

* * * * *